METHOD OF GROWING EPITAXIAL LAYERS FROM BINARY SEMICONDUCTOR COMPOUNDS

Filed June 30, 1966

United States Patent Office 3,480,472
Patented Nov. 25, 1969

3,480,472

METHOD OF GROWING EPITAXIAL LAYERS FROM BINARY SEMICONDUCTOR COMPOUNDS

Hansjürgen Dersin Ottobrunn, and Horst-Paul Lochner, Bayreuth, Germany, assignors to Siemens Aktiengesellschaft, Berlin, Germany, a corporation of Germany
Filed June 30, 1966, 561,803
Claims priority, application Germany, July 5, 1965, S 97,994
Int. Cl. C23c *13/04;* B44d *1/02*
U.S. Cl. 117—201 20 Claims

ABSTRACT OF THE DISCLOSURE

Described is a method of producing epitaxially grown layers of hyperpure III–V binary semiconductor compounds of stoichiometric composition by precipitation from the gaseous phase. The method comprises the steps of placing a first component of the compound in elemental form into a first reaction vessel and heating the first component to a reaction temperature above its melting point but below the minimum temperature of reaction with the vessel material, then successively adding small quantities of the second component in form of a halogen compound to the molten first component while maintaining the melt in motion, and continuing the supply of the second component until the two components have reacted to form a pulverulent semiconductor compound, liberating the pulverulent semiconductor compound from the by-products of the reaction, thereafter placing the semiconductor compound into a second reaction vessel of annealable material and subjecting the semiconductor compound in the second vessel to a reaction gas at a temperature higher than the reaction temperature to thereby form a dissociable compound, precipitating the semiconductor compound from said dissociable compound upon a heated carrier in said second vessel, and thereafter transferring the precipitated semiconductor material from the carrier by transport reaction to a substrate to form a layer thereupon.

Our invention relates to a method for growing epitaxial layers from hyperpure, particularly silicon-free, binary semiconductor compounds of stoichiometric composition, preferably $A^{III}B^{V}$ compounds.

The known method of producing semiconductor compounds, or epitaxially grown layers from such compounds, leave much to be desired. For example, when producing semiconductor compounds by melting the components together, the fact that the vapor pressures of the respective components may considerably differ from each other, such as by several atmospheres, makes it very difficult and costly to attain the accurate stoichiometric composition required for epitaxially grown layers suitable for electronic and other semiconductor purposes. Departures from the stoichiometric composition, however, have undesired doping effects which are not accurately controllable.

The production of semiconducting compounds by reaction in the gaseous phase has the disadvantage that it must be carried out at relatively high temperatures so that ingress of impurities from the reaction vessel cannot virtually be avoided. It is particularly disturbing that at the high reaction temperatures the components, present in vaporous form, will partially react with the silicon of the quartz vessels.

It is an object of our invention to eliminate the above-mentioned shortcomings and disadvantages.

Another, more specific object of the invention is to afford the production of binary semiconductor compounds at relatively low temperatures and subsequently converting the compounds to monocrystalline constitution by epitaxial growth of layers within vessels in which the ingress of impurities into the product is prevented.

To achieve these objects and in accordance with our invention, we proceed as follows. We place a first component of the semiconductor compound to be produced, in elemental form into a first reaction vessel of silicon-containing material, for example quartz glass, and heat the elemental component in the vessel to a reaction temperature above the melting point but below 400° C. We then add the second component in compound form to the melt by slowly and successively adding small quantities while continuously stirring the melt. We continue the slow addition of the second component until the conversion of the components to the semiconductor compound is terminated. We then separate the originally pulverulent semiconductor compound from the byproducts of the reaction and place the semiconductor compound into a second reaction vessel of a material that can be annealed at extremely high temperatures, for example 3000° C. In this second vessel we subject the compound to heating at a temperature higher than the above-mentioned reaction temperature in the presence of a transporting gas. The evolving gaseous compound or compounds become dissociated, and we provide a heated substrate upon which the segregating semiconductor compound is precipitated to form an epitaxial layer.

The reaction is preferably performed in an open reaction vessel under the exclusion of moisture, preferably with the aid of a protective gas atmosphere.

When producing binary semiconductor compounds, for example those of gallium or indium, the first component used in elemental form as the starting material of the process according to the invention, is preferably the more strongly electropositive element of the compound to be produced. For example, when producing the just-mentioned compounds of gallium or indium, the elemental starting component consists of gallium or indium. The second component is preferably supplied in form of a halogenide, especially as a chloride. This second component is added in liquid constitution, such as by employing a drip funnel, to the melt of the first component contained in the reaction vessel.

After termination of the reaction, the reaction mixture is preferably heated to a temperature about 200° higher than the reaction temperature. This causes a portion of the resulting by-products to vaporize and to precipitate above the melt onto the walls of the reaction vessel. Thereafter the reaction product can be taken up by concentrated hydrochloric acid and can be heated. Subsequently, the resulting semiconductor compound is filtered off the non-consumed starting material. The remaining solution contains the by-products of the reaction. Thereafter, a semiconducting compound, resulting from the reaction and isolated by filtering, is subjected to heating in vacuum for a short period of time, thus removing any residual impurities, for example water. If necessary, the semiconducting compound, now having pulverulent form, may be converted by tempering to a compact body or may be directly employed for growing epitaxial layers.

The semiconductor compound resulting from the reaction of the components is placed into the second reaction vessel and is heated by means of a heatable support to a temperature of about 800 to 1000° C. in the presence of a reaction gas. At this temperature, the semiconductor compound is converted by the reaction gas into at least one gaseous compound which is subsequently dissociated so that the semiconductor compound precipitates upon a heated substrate mounted at a given distance from the carrier. In this manner, a monocrystalline layer of the compound is grown on the substrate. This epitaxial layer is distinguished by an extremely high degree of purity, due to the fact that the conversion of the components, preferably effected in vessels of quartz glass, took place at relatively low temperatures, preferably below 400° C.

The subsequently performed transport reaction, requiring higher temperatures such as 800 to 1000° C., to effect purification of the semiconducting compound resulting from the reaction and to produce the epitaxial layer, is performed in a carbon vessel which is previously heated at about 3000° C. in hydrogen and/or a gas mixture serving as reaction gas. By virture of such annealing at an extremely high temperature, virtually all impuriites are eliminated as might interfere with the transport reaction and might affect the properties of the grown layers produced. The purifying effect can be augmented by repeating the transport reaction several times, if desired.

An example of producing gallium arsenide in the above-described manner is as follows. Employed as the first component is elemental gallium. Used as the second component is arsenic in the form of arsenic trichloride. The quantities used correspond substantially to stoichiometric proportions, namely 50 atoms percent Ga to 50 atoms percent of As. The reaction is effected at a temperature of about 200° C. Similarly, for producing gallium phosphide, the first component is gallium and the second component is phosphorus in the form of phosphorus trichloride, the reaction being performed at about 200° C.

The production of the corresponding indium compounds proceeds analogously. For example the first component is metallic indium, and the second component is arsenic in the form of arsenic trichloride. In this case the reaction of the two components is effected at about 350° C. When producing indium phosphide, the second component is added, for example, as phosphorus trichloride to the molten indium and reacted therewith at a temperature of about 300° C.

Suitable as reaction gas for converting the resulting pulverulent semiconductor compound to the monocrystalline constitution, are virtually all substances capable of forming vaporizable compounds with the semiconductor compounds or their components, provided the vaporizable compounds are pyrolytically dissociable to the desired semiconductor compound and a gaseous compound. Among the suitable reaction gases are, for example, iodine, steam, hydrogen halide or the like. The presence of hydrogen is advantageous in many cases.

Epitaxially grown layers consisting of semiconductor compounds produced according to the invention are suitable for virtually all semiconductor components such as rectifiers, transistors or the like. In such semiconductor devices, one or several layers may consist of semiconductor compounds produced by the above-described method according to the invention.

The invention will be further described with reference to the accompanying drawings in which.

Figures 1, 2, 3, 4, 5:
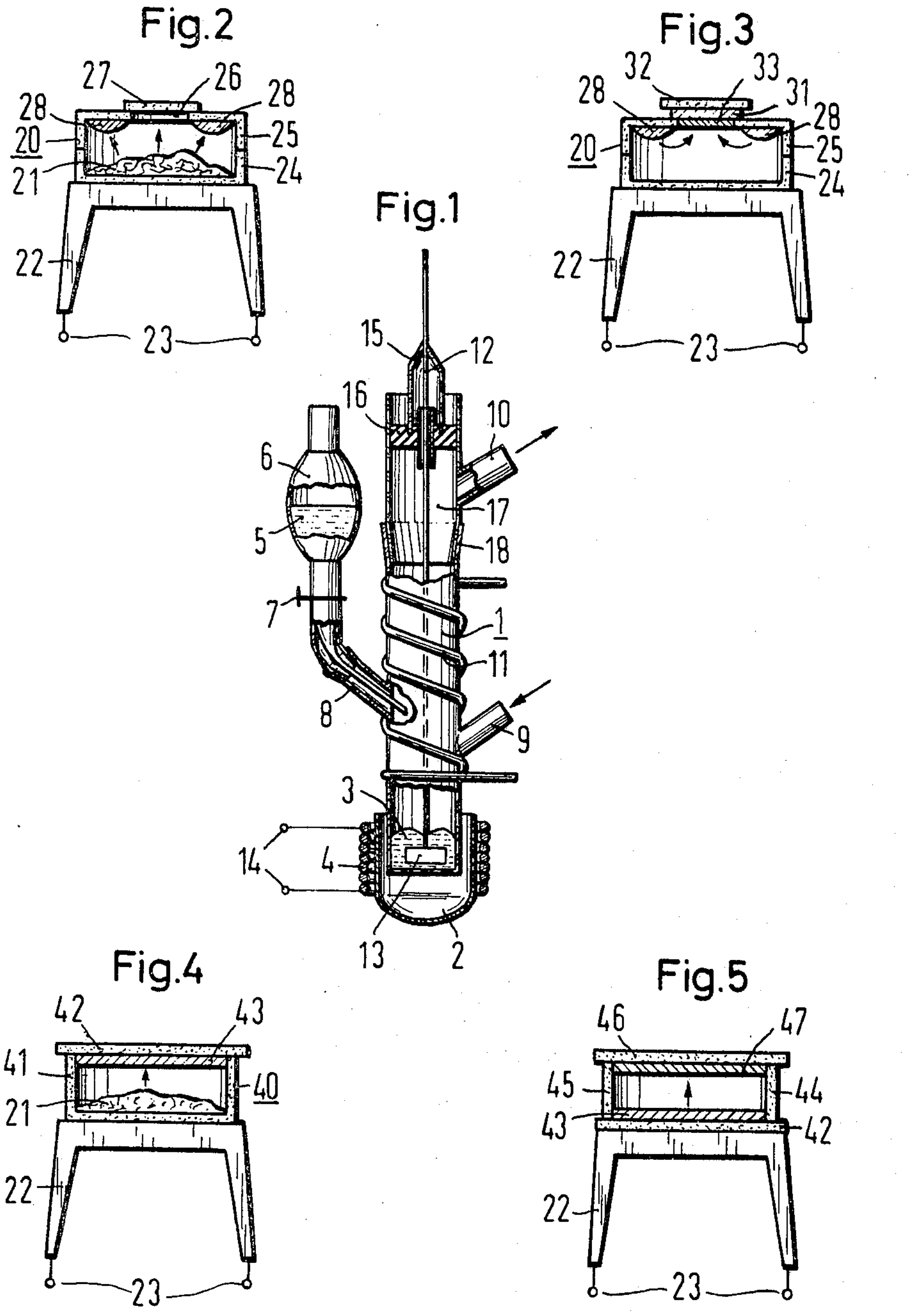
FIG. 1 shows schematically and partly in section a reaction apparatus for performing the method.
FIGS. 2 and 3 show partly in section a device for converting the semiconductor compound to an epitaxial layer upon a substrate, the two illustrations relating to different stages respectively of the method according to the invention.

FIGS. 4 and 5 analogously illustrate a different embodiment of apparatus corresponding to the processing stages represented in FIGS. 2 and 3 respectively.

The reaction vessel 1 according to FIG. 1 consists of quartz. Its bottom portion is immersed in a temperature bath 2 and is charged with metallic gallium 3. The temperature bath 2 is maintained at about 200° C. with the aid of an electric heater 4 whose terminals 14 are to be connected to a suitable voltage source. Slowly added to the molten gallium is arsenic trichloride 5 in liquid form. The liquid is dripped into the melt from a funnel 6 which can be closed entirely or partially be means of a valve 7 and is joined with the reaction vessel 1 at a lateral neck portion 8 with which it is removably sealed by a conical nipple junction. The reaction vessel is further provided with a lateral lower nipple tube for supplying protective gas and an upper outlet tube 10 through which the protective gas leaves the vessel. Suitable as protective gas are hydrogen, nitrogen, argon or other noble gases. The reaction vessel 1 is further provided with a cooling coil 11 to prevent escape of the vapors evolving during the reaction. The reaction is promoted by intimate mixing with the aid of a stirrer 12 whose lower end carries a propeller 13. The stirrer 12 is introduced from above into the vessel 1 and is vacuum-tightly sealed by means of a bell 15 and a sealing plate. To facilitate manipulating the apparatus, the upper portion 17 of the vessel 1 can be removed. A ground conical sealing engagement at 18 provides a sealed junction between the upper portion 17 and the lower portion.

The reaction of gallium and arsenic trichloride corresponds to the equation $$2Ga+AsCl_3=GaAs+GaCl_3$$

This reaction is effected at about 200° C. Upon its termination, the supply of arsenic trichloride is terminated by closing the valve 7, and the mixture contained in the reaction vessel 1 is heated to about 400° C. with the aid of the electric heater 4. The gallium trichloride formed by the reaction is thus evaporated and precipitates upon the vessel wall having a lower temperature. Thereafter the reaction product is taken up by concentrated hydrochloric acid and heated. This converts the gallium, still contained in the reaction vessel, to gallium trichloride which remains in the acid solution. After filtering, virtually pure gallium arsenide is obtained as the residue. By heating this residue for a short time in vacuum, the gallium arsenide is liberated from volatile byproducts, for example arsenic and water. The gallium arsenide, now having pulverulent constitution, may be directly employed for growing expitaxial layers, or it may first be converted by tempering to a compact material.

The same reaction vessel may be employed for producing indium phosphide. In this case, elemental indium is entered as 3 into the reaction vessel 1 and heated by the heater 4 through the bath 2 to a temperature of about 400° C. Added to the resulting melt and while continuously stirring the melt, is liquid phosphorous trichloride dripping from the funnel 6. Only small quantities of phosphorous trichloride are supplied at a time by correspondingly setting the valve 7. The reaction of the components then takes place as described in the foregoing. After the reaction is completed, the product is temporarily heated to about 600° C., in order to separate indium chloride evolving as a byproduct. Thereafter the reaction product is taken up by concentrated hydrochloric acid and heated. This dissolves the byproducts resulting from the reaction, as well as any excess of indium. The indium phosphide is thereafter separated from the solution by filtering. Subsequently, the isolated indium phosphide is heated for a short period of time in vacuum and thereby liberated from any residual byproducts such as water and phosphorus. The indium phosphide, now having the form of a powder, can be directly employed for the production of epitaxially grown layers, or it may be subjected to tempering in order to convert the pulverulent material to compact indium-phosphide bodies.

The other semiconductor compounds can be synthesized in an analogous manner by correspondingly setting the reaction conditions. The materials produced by the method according to the invention are distinguished by extremely high purity as well as by a strictly stoichiometric composition. By virtue of the fact that the processing temperatures are low, an ingress of impurities from the vessel walls is completely avoided. Furthermore, at the low temperatures the differences in vapor pressure between the individual components do not become aggravating to any extent comparable with the difficulties encountered when melting the components together at considerably higher temperatures.

The epitaxial layers are grown with the aid of equipment as illustrated by the examples schown in FIGS. 2 to 5.

According to FIG. 2, for example, the semiconductor compound 21, for example gallium arsenide, obtained by reaction of the components at low temperatures and available in pulverulent form, is placed directly subsequent to the synthesis into a cup-shaped composite reaction vessel 20 of carbon. The vessel 20 is then heated by means of a heating bridge 22 whose terminals 23 are to be connected with a voltage source. Prior to entering the semiconductor material 21, the reaction vessel 20 is annealed at about 3000° C. in hydrogen or in a gas mixture suitable as a reaction gas, for example $H_2O$ and $H_2$, or HCl and $H_2$. As a result, the reaction vessel 20 is virtually free from impurties. The relation vessel is composed of a bottom portion 24 and a top portion 25. The top portion has one or more windows 26. These are closed by respective carbon discs 27. For simplicity only one window 26 and only one carbon disc 27 are illustrated.

After entering the pulverulent semiconductor material and closing the window openings, the vessel is electrically heated to about 1000° C. This causes the semiconducting material 21 to be transported from the bottom of the vessel to the opposite top portion 25 where the semiconductor material precipitates in purified constitution upon the surface areas 28 adjacent to the window. Any residual impurities contained in the pulverulent material are transferred to the carbon disc 27. As soon as the transfer of the semiconductor material 21 is terminated, the carbon disc 21 is removed and a substrate disc 31, shown in FIG. 3, is substituted. The substrate 31 consists, for example, of monocrystalline gallium arsenide. For ensuring uniform heating of the substrate 31, a cover plate 32 of aluminum oxide, such as sintered alumina, or of carbon is placed on top of the substrate. At a heating temperature of about 1000° C. there occurs a transport of semiconductor material from the areas 28 to the substrate 31. When using a monocrystalline substrate of the same material as the one to precipitated, or of a material having the same crystalline lattice type and approximately the same lattice constant, an epitaxial monocrystalline layer 33 is grown on the bottom side of the substrate disc 31. When using substrate discs of crystallographically dissimilar material, such as metal, aluminum oxide, carbon or the like, a polycrystalline semiconductor material is precipitated.

Another way of producing epitaxially grown layers according to the invention will be described with reference to FIGS. 4 and 5. The pulverulent semiconductor compound 21 is placed into a carbon vessel 30 which may consist of several parts. The cover portion 42 and the bottom portion 41 of the reaction vessel 40 are annealed at about 3000° C. prior to entering the semiconductor material. After the semiconductor material is placed into the vessel, the heater bridge 22 is energized to provide for a vessel temperature of about 1000° C. During heating, the vessel is kept filled or supplied with a reaction gas, for example a mixture of $H_2O$ and $H_2$, although $H_2O$ may also be substituted by halogens or compounds of hydrogen or hydrogen halides. As a result, the semiconductor material 21 is transported from the vessel bottom to the carbon plate 42 which forms the cover of the vessel. Upon termination of the transport, the layer 43 precipitated upon the cover plate 42 is removed, which is readily possible, especially if the layer thickness is larger, and is then used as starting material for the production of the epitaxially grown layer.

However, as shown in FIG. 5, the reaction vessel 40 may simply be reversed so that now the cover plate 42 forms the bottom. The lateral portions 44 and 45 of the reaction vessel 40 then serve as spacers in the further course of the process. Placed upon the spacers is a substrate disc 46. The substrate may consist of monocrystalline material having the same lattice type and the same or a similar lattics constant as the material to be precipitated, or it may consist of a different material, for example aluminum oxide, tungsten, molybdenum, tantalum, carbon or the like. The choice of the substrate material depends upon whether monocrystalline layers are to be grown or whether the production of polycrystalline material is intended. By heating to a temperature of about 1000° C., the layer 43 is separated under the effect of the reaction gas, and the semiconductor compound is transported via the gaseous phase upon the substrate disc 46 to form a monocrystalline or polycrystalline layer 46, depending upon the choice of the substrate material.

The semiconductor materials produced in the above-described manner according to the invention are eminently well suitable for the manufacture of semiconductor circuit components. For example, dopants for producing donors or acceptors may be added during the epitaxial growth in order to obtain a desired doping of the grown layer. Furthermore, the method of the invention may be modified by adding dopants to the starting materials during the synthesis stage of the process.

We claim:

1. The method of producing epitaxially grown layers of hyperpure III–V binary semiconductor compounds of stoichiometric composition by precipitation from the gaseous phase, which comprises the steps of placing a first component of the compound in elemental form into a first reaction vessel and heating the first component to a reaction temperature above its melting point but below the minimum temperature of reaction with the vessel material, then successively adding small quantities of the second component in form of a halogen compound to the molten first component while maintaining the melt in motion, and continuing the supply of the second component until the two components have reacted to form a pulverulent semiconductor compound, liberating the pulverulent semiconductor compound from the byproducts of the reaction, thereafter placing the semiconductor compound into a second reaction vessel of annealable material and subjecting the semiconductor compound in the second vessel to a reaction gas at a temperature higher than the reaction temperature to thereby form a dissociable compound, precipitating the semiconductor compound from said dissociable compound upon a heated carrier in said second vessel, and thereafter transferring the precipitated semiconductor material from the carrier by transport reaction to a substrate to form a layer thereupon.

2. The method according to claim 1, wherein the reaction temperature in said first vessel is below 400° C.

3. The method according to claim 2, which comprises the step of pre-annealing the second reaction vessel at a temperature of about 3000° C.

4. The method according to claim 1, wherein said reaction in said first reaction vessel is performed with the vessel kept open, and under exclusion of moisture by means of a protective gas.

5. The method according to claim 1, wherein said second component is a halogenide.

6. The method according to claim 1, wherein said second component is a chloride.

7. The method according to claim 5, which comprises dripping the second component into the melt.

8. The method according to claim 5, which comprises temporarily heating the reaction product upon completion of the reaction in said first vessel to a temperature about 200° C. higher than the reaction temperature.

9. The method according to claim 1, which comprises the step of adding concentrated hydrochloric acid to the product of the reaction whereby any unconsumed starting material and any by-products of the reaction go into solution, and thereafter separating the semiconductor compound by filtration.

10. The method according to claim 9, which comprises heating the semiconductor compound in vacuum after filtering in order to remove any residual impurities.

11. The method according to claim 1, which comprises the step of heating the semiconductor compound in said second reaction vessel in the presence of said reaction gas by means of a heated support to a temperature of about 800 to 1000° C.

12. The method according to claim 11, which comprises the step of performing the transport reaction by transferring the semiconductor compound with the air of said reaction gas from said heated support to a substrate crystal spaced from said support in said second vessel.

13. The method according to claim 1, wherein said first compoent is elemental gallium and said second component is arsenic trichloride, the reaction temperature in said first vessel being about 200° C.

14. The method according to claim 1, wherein said first component is metallic gallium and said second component is phosphorus trichloride, the reaction temperature in said first vessel being about 200° C.

15. The method according to claim 1, wherein said first component is metallic indium and said second component is arsenic trichloride, said reaction temperature in said first vessel being about 450° C.

16. The method according to claim 1, wherein said first component is metallic indium and said second component is phosphorus trichloride, the reaction temperature in said first vessel being about 400° C.

17. The method according to claim 1, which comprises converting the pulverulent semiconductor compound by said transport reaction to monocrystalline constitution on said substrate, said reaction gas containing iodine.

18. The method according to claim 17, wherein said reaction gas is a mixture of iodine and hydrogen.

19. The method according to claim 1, wherein the reaction gas for said transport reaction comprises water vapor.

20. The method according to claim 19, wherein said reaction gas is a mixture of steam and hydrogen.

References Cited

UNITED STATES PATENTS

| | | | |
|---|---|---|---|
| 3,008,805 | 11/1961 | Addamiano et al. | 23—204 |
| 3,077,384 | 2/1963 | Enk et al. | 23—204 |
| 3,224,913 | 12/1965 | Ruehrwein | 23—204 X |

ANDREW G. GOLIAN, Primary Examiner

U.S. Cl. X.R.

23—204; 117—66, 106; 148—175; 282—623